(12) United States Patent
Vauchel et al.

(10) Patent No.: US 8,951,006 B2
(45) Date of Patent: Feb. 10, 2015

(54) NACELLE FOR THE JET ENGINE OF AN AIRCRAFT

(75) Inventors: Guy Bernard Vauchel, Le Havre (FR);
Nicolas Hillereau, Le Havre (FR);
Jerome Collier, Le Havre (FR);
Pierre-Alain Chouard, Paris (FR);
Guillaume Lefort, Paris (FR)

(73) Assignee: Aircelle, Gonfreville l'Orcher (FR)

( * ) Notice: Subject to any disclaimer, the term of this patent is extended or adjusted under 35 U.S.C. 154(b) by 752 days.

(21) Appl. No.: 12/527,086

(22) PCT Filed: Nov. 23, 2007

(86) PCT No.: PCT/FR2007/001923
§ 371 (c)(1),
(2), (4) Date: Aug. 13, 2009

(87) PCT Pub. No.: WO2008/102068
PCT Pub. Date: Aug. 28, 2008

(65) Prior Publication Data
US 2010/0008772 A1    Jan. 14, 2010

(30) Foreign Application Priority Data

Feb. 14, 2007   (FR) .................................... 07 01059

(51) Int. Cl.
*F01D 25/24*     (2006.01)
*B64D 29/08*    (2006.01)
*F02K 1/00*      (2006.01)

(52) U.S. Cl.
CPC . *B64D 29/08* (2013.01); *F02K 1/00* (2013.01); *Y02T 50/671* (2013.01); *F05D 2230/80* (2013.01)

USPC ...................... 415/126; 415/214.1; 415/213.1

(58) Field of Classification Search
CPC ............................... F01D 25/265; F01D 25/28
USPC ............ 60/798, 796, 797; 415/126, 127, 128, 415/201, 213.1, 214.1, 232
See application file for complete search history.

(56) References Cited

U.S. PATENT DOCUMENTS 4,037,809 A * 7/1977 Legrand ........................... 244/54
4,920,744 A * 5/1990 Garcia et al. .................. 60/226.1
(Continued)

FOREIGN PATENT DOCUMENTS

EP              0155877             9/1985
EP              0391495             10/1990
(Continued)

OTHER PUBLICATIONS

International Search Report PCT/FR2007/001923 Dated Jun. 5, 2008.

*Primary Examiner* — Ninh H Nguyen
(74) *Attorney, Agent, or Firm* — Brinks Gilson & Lione (57) ABSTRACT

The invention relates to a nacelle for a turbojet, of the type comprising a downstream structure having an outer structure (6) that defines, together with an inner concentric structure (9) for surrounding the downstream portion of the turbojet, an annular flow channel (8), characterised in that a portion at least of said inner structure (9) is mounted so as to be capable of a translation movement along the longitudinal axis of the nacelle so that it can move between a working position, in which the inner structure acts as a casing for the downstream portion of the turbojet, and a maintenance position in which the inner structure exposes said downstream portion of the turbojet.

12 Claims, 10 Drawing Sheets

(56) References Cited

U.S. PATENT DOCUMENTS 5,035,379 A * 7/1991 Hersen et al. ............... 244/129.4
6,179,249 B1 * 1/2001 Canadas ...................... 244/53 R
7,703,716 B2 * 4/2010 Bulin .......................... 244/53 R
7,789,347 B2 * 9/2010 Oberle et al. ............... 244/129.4

FOREIGN PATENT DOCUMENTS

| | | |
|---|---|---|
| FR | 2622930 | 5/1989 |
| FR | 2757823 | 7/1998 |
| GB | 2274490 | 7/1994 |

* cited by examiner

NACELLE FOR THE JET ENGINE OF AN AIRCRAFT

TECHNICAL FIELD OF THE INVENTION

The invention relates to an airplane turbojet engine nacelle, of the type comprising a downstream structure comprising an outer structure which defines, with a concentric inner structure intended to surround a downstream part of the turbojet engine, an annular flow duct, which duct is also known as the flow path.

BRIEF DISCUSSION OF RELATED ART

An airplane is propelled by a number of turbojet engines each housed in a nacelle that also houses a collection of ancillary actuating devices associated with the operation thereof and performing various functions when the turbojet engine is operating or stationary. These ancillary actuating devices notably comprise a mechanical system for the actuation of thrust reversers.

A nacelle generally has a tubular structure comprising an air intake upstream of the turbojet engine, a middle section intended to surround a fan of the turbojet engine, a downstream section housing thrust reversal means and intended to surround the combustion chamber of the turbojet engine, and generally ends in a jet pipe the outlet of which is situated downstream of the turbojet engine.

Modern nacelles are intended to house a bypass turbojet engine capable, via the blades of the rotating fan, of generating a flow of hot air (also known as the primary flow) from the turbojet engine combustion chamber, and a flow of cold air (the secondary or bypass flow) which flows around the outside of the turbojet engine through an annular passage also known as a flow path.

A nacelle for an engine such as this generally has an outer structure known as the Outer Fixed Structure (OFS) which, together with a concentric inner structure known as the Inner Fixed Structure (IFS) surrounding the structure of the actual engine behind the fan, defines the flow path intended to channel the flow of cold air which passes around the outside of the engine. The primary and secondary flows are ejected from the engine via the rear of the nacelle.

Each airplane propulsion unit is thus formed of a nacelle and of an engine, and is suspended from a fixed structure of the airplane, for example under a wing or on the fuselage, via a pylon or a strut attached to the engine or to the nacelle.

The inner structure of the nacelle is usually formed of two half-shells of substantially semicylindrical shape, one on each side of a longitudinal vertical plane of symmetry of the nacelle, and mounted such that they can move in such a way that they can be deployed between a working position and a maintenance position with a view to providing access to the engine for maintenance operations.

According to the prior art, the two half-shells are generally pivot-mounted about a longitudinal axis that forms a hinge at the top (in the 12 o'clock position) of the reverser. The half-shells are kept in the closed position by latches positioned along a meeting line situated in the bottom part (in the 6 o'clock position).

To do this, it is necessary beforehand to open up the outer structure in order to be able to open the half-shells. The outer and inner structures are connected and kept open by a system of jacks and link rods.

According to certain embodiments, each half-shell of the inner structure is securely fastened to the corresponding half-shell of the outer structure via a connecting island so that it can be opened together with the outer structure. An embodiment such as this is advantageous and thus requires just one line of hinges for the outer structure.

The operations of opening into the maintenance position are laborious because they entail raising the half-shells, and these half-shells in the deployed position may constitute an obstacle hazardous to maintenance personnel, particularly should the support means break.

BRIEF SUMMARY OF THE INVENTION

The invention avoids the above mentioned disadvantages and the invention therefore relates to a nacelle for a turbojet engine, of the type comprising a downstream structure comprising an outer structure which defines, with a concentric inner structure intended to surround a downstream part of the turbojet engine, an annular flow duct, characterized in that at least part of said inner structure is mounted such that it can move translationally along a longitudinal axis of the nacelle so that it can be moved between a working position in which the inner structure acts as a case for the downstream part of the turbojet engine and a maintenance position in which the inner structure uncovers said downstream part of the turbojet engine.

Thus, by providing an inner structure that is able to move translationally in a longitudinal direction of the nacelle, said inner structure no longer has to be opened laterally to access the turbojet engine but simply has to be made to undergo a translational movement. As a result, the invention makes it possible to reduce the mass that has to be raised, possibly at the same time as the parts of the outer structure, and makes it possible to simplify the operations involved in opening and the means needed to do this. Of more particular note are the lightening of the supporting link rods, the elimination of any internal hinge line and the lightening of the outer hinge line.

This also results in a greater level of safety during maintenance operations. Furthermore, it will be noted that the inner structure may possibly undergo its translational movement without the need fully to open the outer structure, it being possible simply to provide a small hatch in this outer structure.

As a preference, the inner structure is produced in the form of at least two half-parts.

Again as a preference, the half-parts are situated on each side of a longitudinal plane of symmetry of the nacelle.

Advantageously, the inner structure comprises at least one locking device for locking in the working position.

Again advantageously, said locking device can be activated through the interposition of a flexible actuating cable arranged from downstream to upstream of the half-shell.

Preferentially, the outer structure is able to be opened in a translational movement, the inner structure being attached to the outer structure via at least one driving link rod.

Advantageously, the inner structure is able to be moved translationally with respect to the nacelle by means of at least one rail/slide system.

As an alternative or as a supplement, the inner structure has at least one fixed fairing part fixed upstream to the turbojet engine, possibly via a frame. Advantageously, the fixed fairing part is fixed downstream to means of suspending the turbojet engine from a strut.

Alternatively or in addition, the fixed fairing part has, downstream, means of suspension from the turbojet engine.

Advantageously, said fixed fairing part has a shape such that in the working position, it falls more or less inside the exterior contour of the inner structure.

According to a first embodiment, the slide is intended to be fixed to the downstream part of the turbojet engine while the corresponding rail is secured to the inner structure, or vice versa.

According to a second embodiment, the fixed fairing part has at least one lateral rail, or a slide, able to collaborate with a complementary slide, or a rail, of the inner structure.

The present invention also relates to a bypass turbojet engine intended to be inserted in a nacelle as described hereinabove, characterized in that it has a downstream part comprising at least one slide or one rail able to collaborate with a rail or a slide secured to an inner structure of the nacelle.

Advantageously, the slide or the rail that is intended to be fixed to the downstream part of the turbojet engine has at least one curved upstream portion capable of allowing radial divergence or convergence with respect to the inner structure during movement along the downstream part of the turbojet engine, and a substantially straight downstream portion that is preferably substantially parallel to a plane of symmetry of the nacelle. To ensure the stability of the inner structure during its translational movement, it would be possible to provide several slides distributed along the inner structure and/or along the turbojet engine and each having the same profile.

Preferentially, the upstream portion for radial divergence or convergence is of parabolic shape.

The present invention finally relates to a propulsion unit for an aircraft, characterized in that it comprises, on the one hand, a turbojet engine according to the invention and, on the other hand, a nacelle according to the first embodiment of the invention.

Evidently, the present invention also relates to a propulsion unit comprising a nacelle according to the invention and a turbojet engine according to the prior art, with no slide or rail.

BRIEF DESCRIPTION OF THE DRAWINGS

Other features and advantages of the invention will become evident from reading the following description which is given by way of example and by referring to the attached drawings, in which.

DETAILED DESCRIPTION OF THE INVENTION

FIGS. 1 to 8 depict a first embodiment of a nacelle according to the invention.

Figure 1:
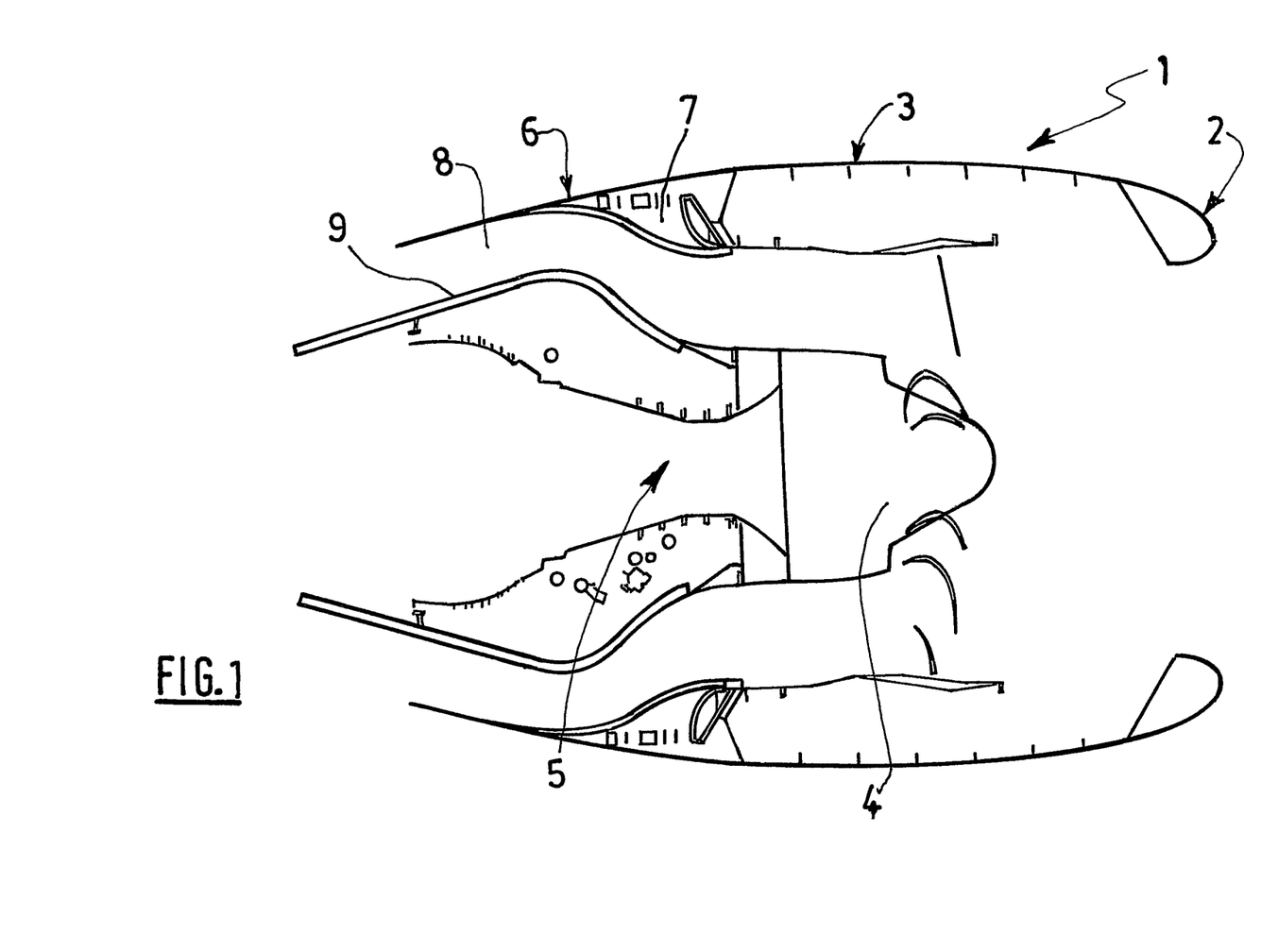
FIG. 1 is a sectional side view of a nacelle according to the invention comprising an inner structure in the working position.

A nacelle 1, as shown in section in FIG. 1, comprises an upstream air intake structure 2, a middle structure 3 surrounding a fan 4 of a turbojet engine 5, and a downstream structure comprising, in a way known per se, an outer structure 6 known as the OFS, housing thrust reversal means 7 and which defines an annular flow duct 8 with a concentric inner structure (IFS) 9 surrounding a downstream part of the turbojet engine 5 extending to the rear of the fan 4.

Figure 2:
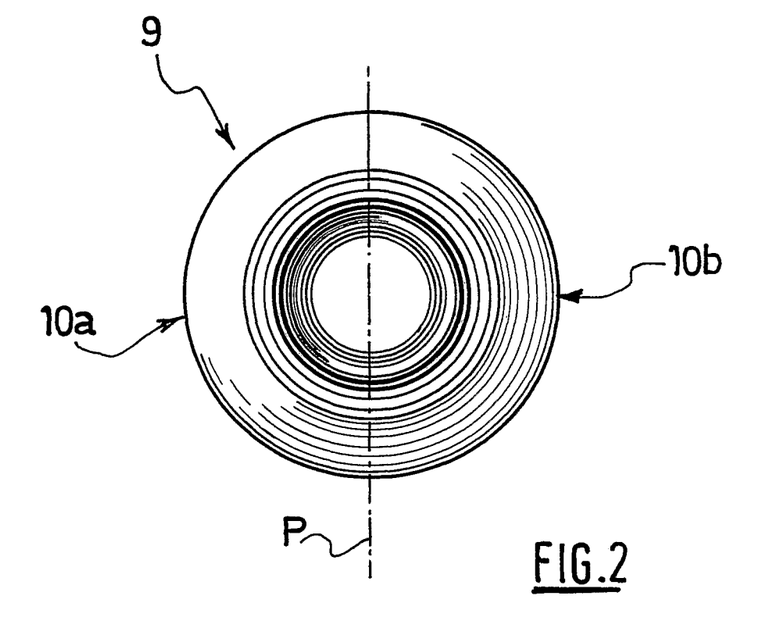
FIG. 2 is an end-on view, from the front, of an inner structure of a nacelle according to the invention, in the working position.
Figure 3:
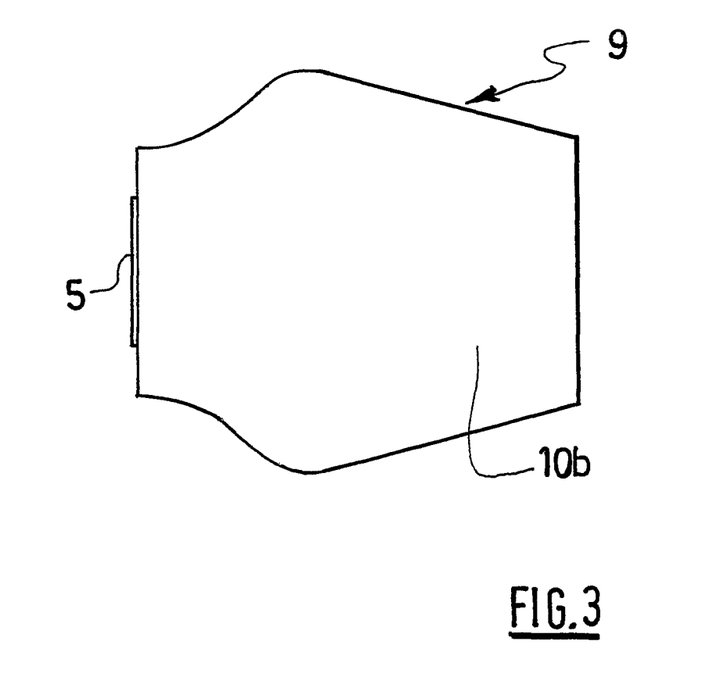
FIG. 3 is a side view of the nacelle inner structure of FIG. 2, in the working position.
Figure 4:
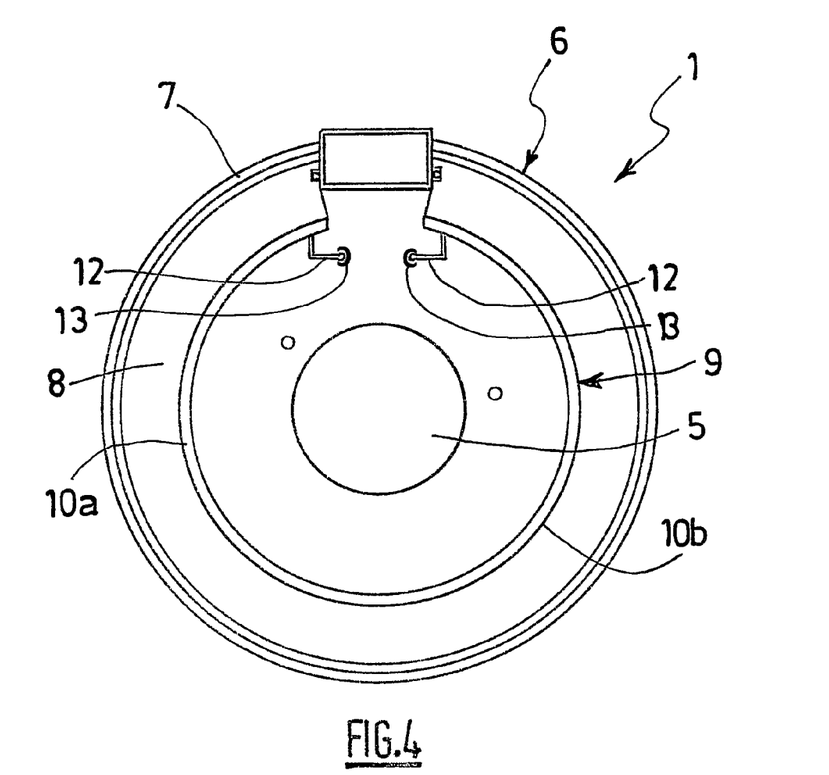
FIG. 4 is a schematic sectional front view of a downstream part of a nacelle according to the invention.

The nacelle inner structure 9, as illustrated in greater detail in FIGS. 2 and 3, is formed of two half-shells 10a and 10b of substantially semicylindrical shape, positioned one on each side of a longitudinal vertical plane P of symmetry of the nacelle.

In FIG. 3, the structure of the turbojet engine 5 is substantially hidden by the half-shells 10a and 10b of the inner structure 9.

Each half-shell 10a or 10b is attached to the outer structure 6 of the nacelle 1 by a driving link rod (not depicted) and is mounted such that it can slide between a working position and a maintenance position by means of at least one rail 12 able to collaborate with a slide 13 (see FIG. 4) which is secured to the turbojet engine 5. More specifically, each half-part has two rails each able to collaborate with a corresponding slide which are arranged along a longitudinal axis of the nacelle. Quite clearly, it would be possible to use as many rail/slide systems as necessary in order to obtain good stability of the inner structure 9 during sliding. Each slide 13 has a curved (in this instance parabolic) upstream section 13a for radially diverging/converging with respect to the turbojet engine 5 and a substantially straight downstream section 3b for axial translation parallel to the plane of symmetry P of the nacelle.

As it moves, the nacelle outer structure 6 pulls along the half-shells 10a and 10b of the inner structure through the interposition of the driving link rods.

Quite clearly, the outer structure 6 may retain an opening system according to the prior art whereby it pivots about a hinge axis, the outer structure 6 then not being connected to the inner structure 9 and it being possible for the latter to be operated manually using, for example, the system that serves to latch the half-parts of the inner structure. Likewise, the outer structure could be moved in the downstream direction without being driven by a link rod from the inner structure (IFS) it being possible for the latter to be operated by hand.

It should therefore be noted that this novel way of opening the inner structure may, but does not necessarily have to, be associated with a corresponding method of opening the outer structure.

Figure 5:
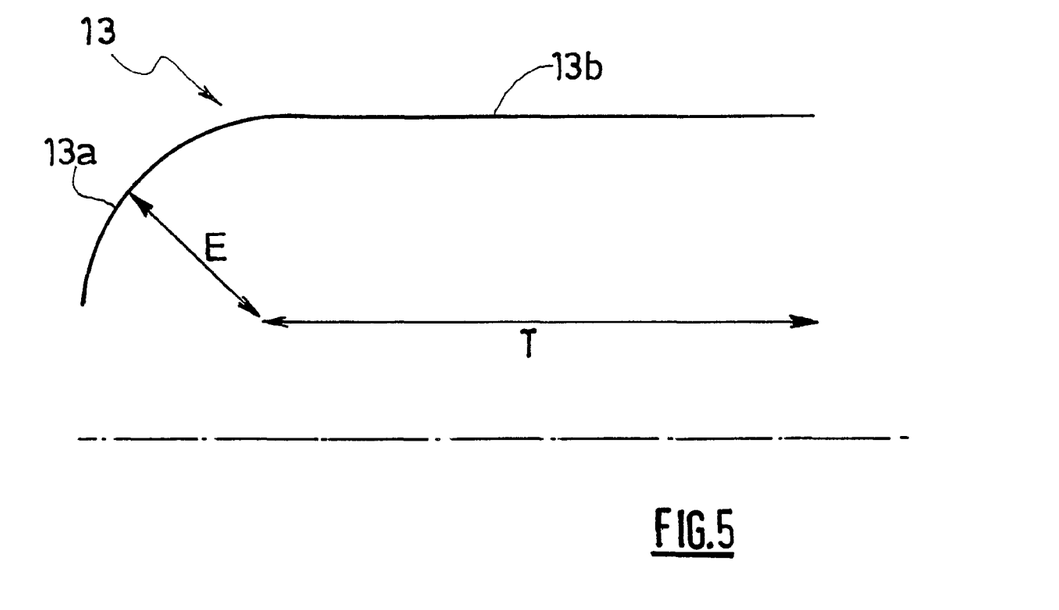
FIG. 5 is a schematic view from above of a slide for guiding the sliding of a half-shell of the previous nacelle inner structure.
Figure 6:
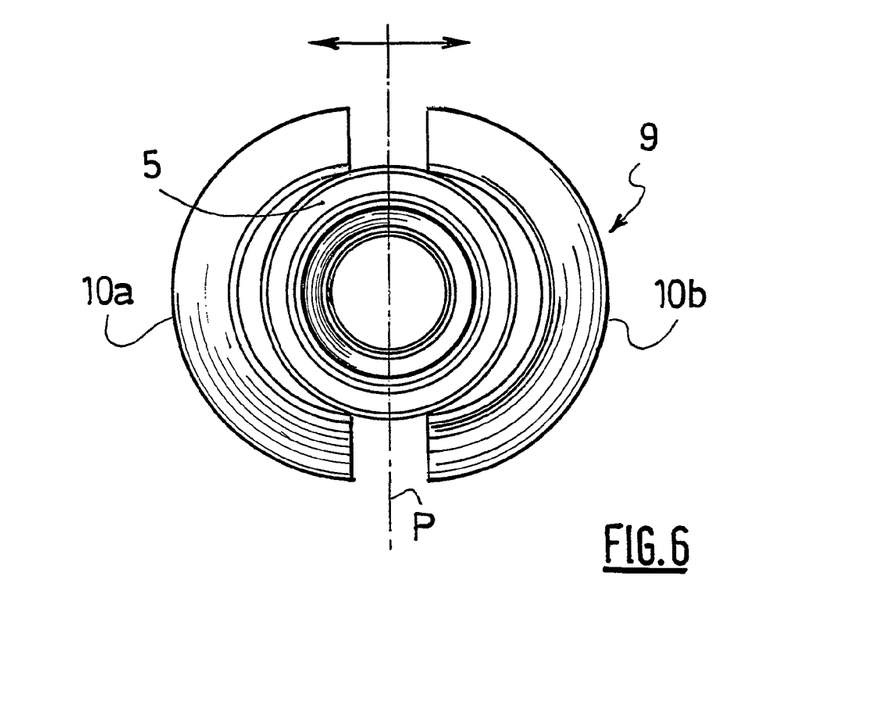
FIG. 6 is a view similar to FIG. 2 in the maintenance position.

In practice, in a first phase E of sliding, the half-shell 10a leaves the working position (see FIG. 2) and diverges from the plane of symmetry P of the nacelle in a substantially parabolic path that conforms to the shape of the upstream section 13a of the slide 13, until it is pressed firmly against an interior wall of the nacelle outer structure (see also FIG. 5).

Figure 8:
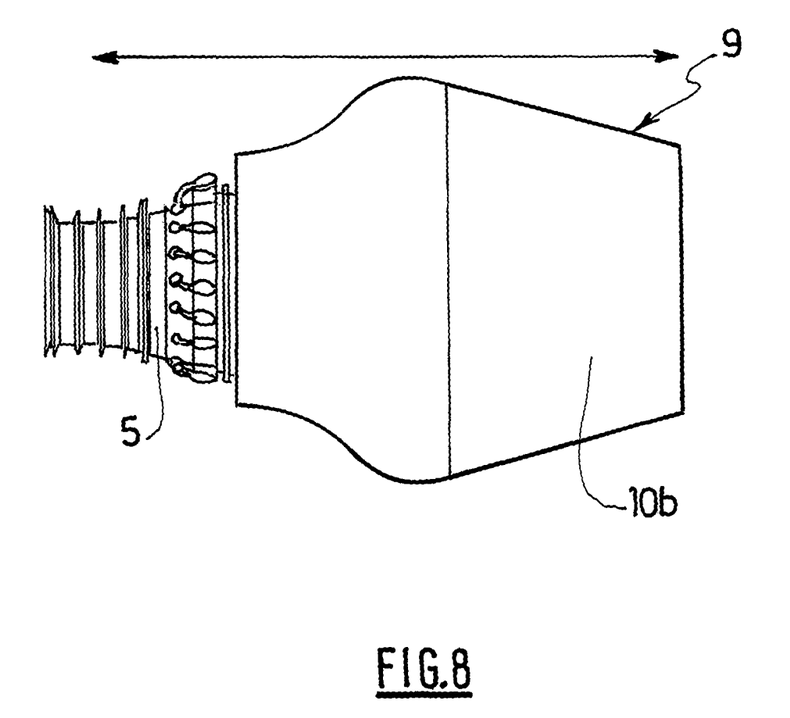
FIG. 8 is a view similar to FIG. 3 in the maintenance position.

In a second phase T of sliding of the half-shell 10a, the latter follows the downstream section 13b of the slide 13 in a path parallel to the plane of symmetry P until the structure of the turbojet engine 5 is uncovered in the maintenance position illustrated in FIG. 8.

Figure 7:
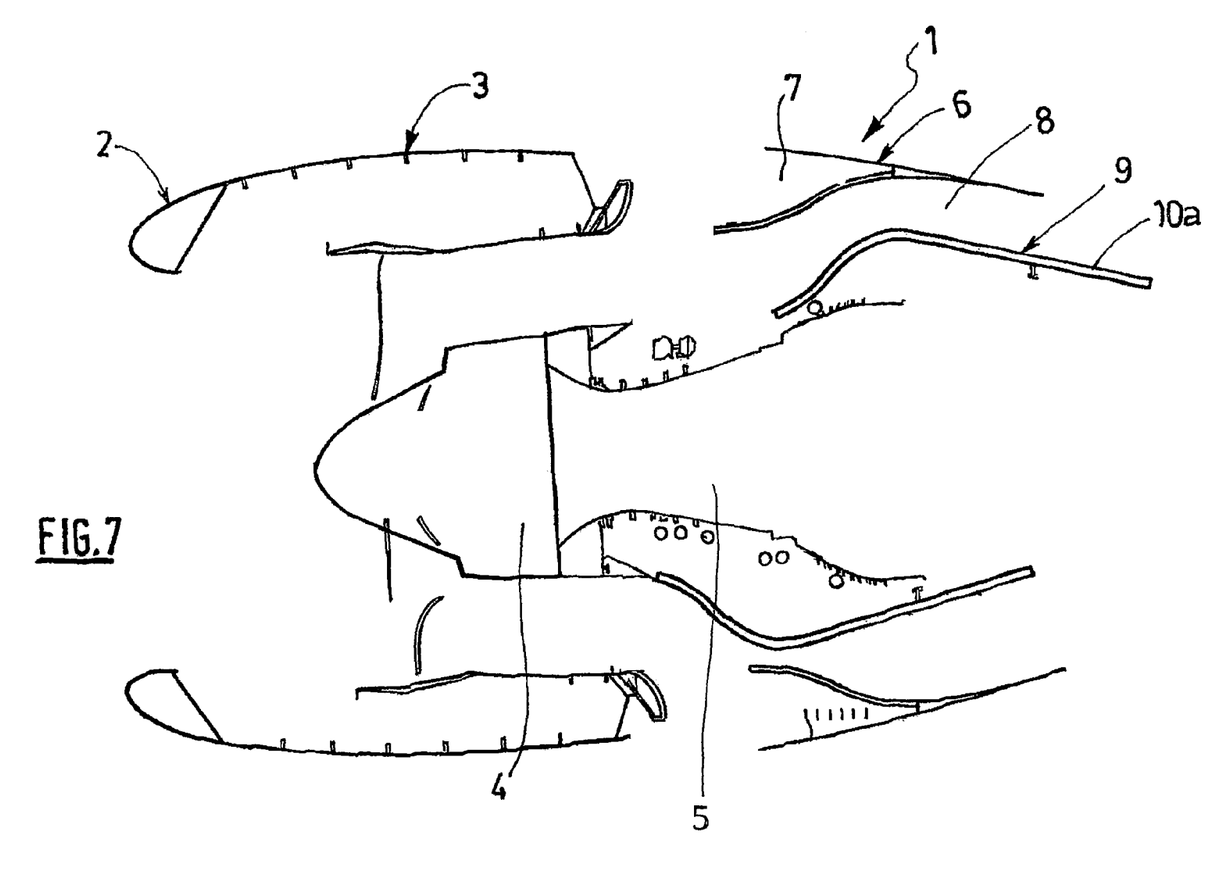
FIG. 7 is a view similar to FIG. 1 in the maintenance position, of just a half-part of the inner structure.

It will be noted that the half-parts 10*a*, 10*b* of the inner structure 9 may possibly undergo translational movement independently of one another, as has been depicted in FIG. 7.

Furthermore, the presence of a divergent initial curved portion is one preferential embodiment dependent on the exterior shape of the turbojet engine 5. If possible, it is clearly conceivable to provide fully rectilinear translational movement along one or more slides, onto which one or more rail sections fit.

The divergence during phase E may also make it possible, during the rearward axial translational phase T, to prevent any risk of collision between the half-shell 10*a* and a strut (not depicted) of the airplane to which the turbojet engine 5 is attached.

Of course, the radial divergence or convergence of the half-shells 10*a*, 10*b* with respect to the turbojet engine is accompanied, because of the shape of the upstream section 3*a*, by a small axial translational movement, in the downstream or upstream direction respectively, of the nacelle 1.

The return of the half-shells 10*a*, 10*b* to the working position is, as goes without saying, achieved by an upstream axial translational movement (along the section 13*b*) followed by radial convergence toward the turbojet engine 5 (along the section 13*a*).

Each half-shell 10, 10*b* further comprises, arranged from downstream to upstream, a plurality of latching devices for locking in the working position. A flexible actuating cable (not depicted) of the "Flexshaft" type is introduced from the rear and deployed toward the front of each half-shell 10*a*, 10*b* and can be used to actuate these latches. This locking system is accessible from the rear and/or via a front frame of the outer structure once an engine fan shroud has been opened.

FIGS. 9 to 15 set out a second embodiment of the nacelle according to the invention comprising an inner structure 110. Only the modified inner structure 110 and the case of the fan 4 of the middle section 3 have been depicted for ease of understanding. The overall structure of the nacelle 1 applies.

Figures 9, 10:
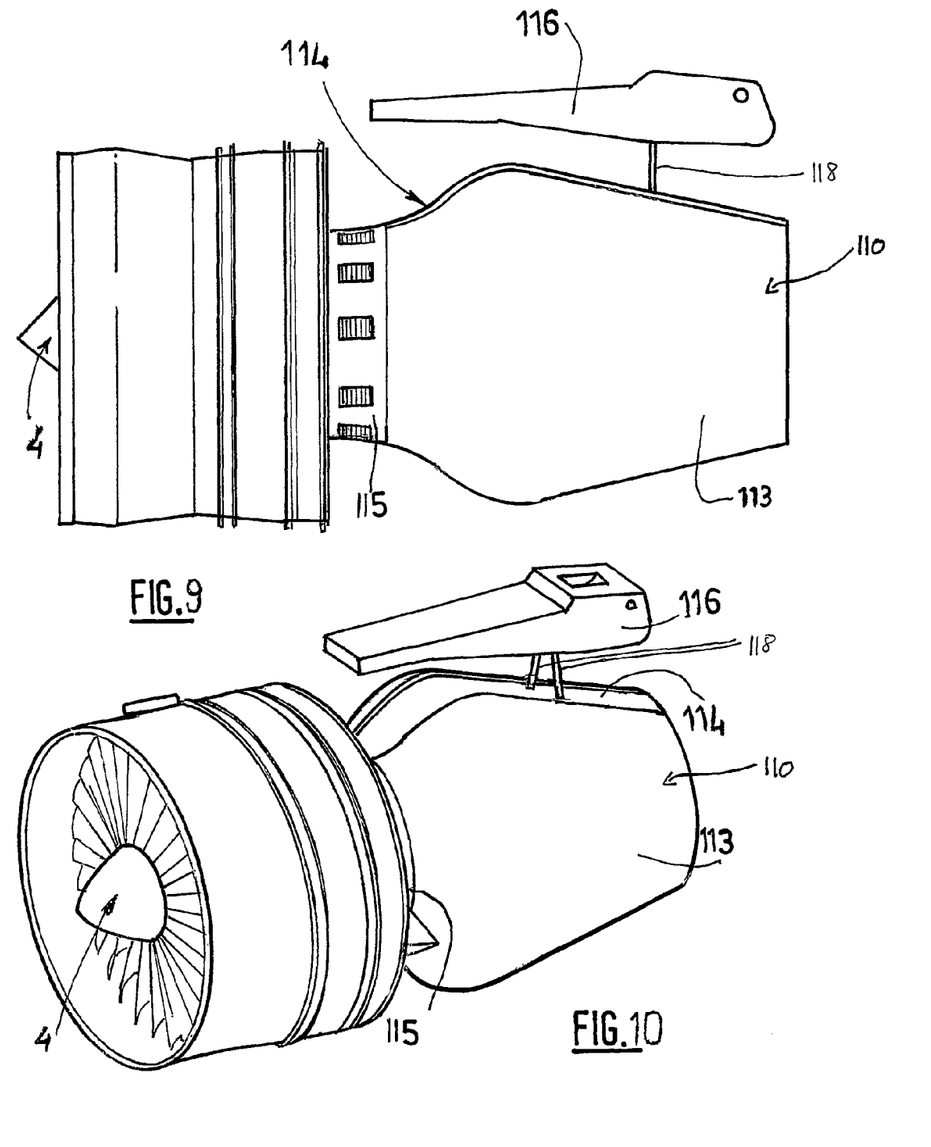
FIG. 9 is a lengthways side view of a nacelle according to the invention in the working position.
FIG. 10 is a perspective view of the nacelle of FIG. 9.
Figure 11:
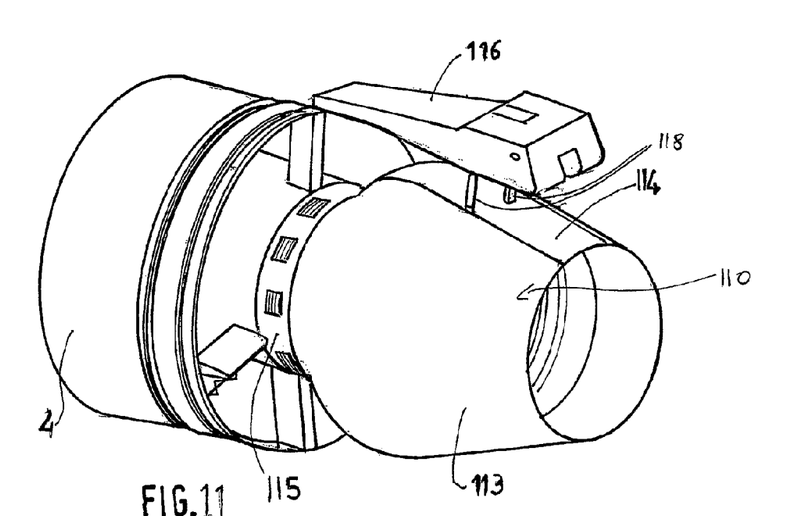
FIG. 11 depicts this same nacelle in perspective, viewed from a different angle, in the working position.

It should be noted that, in FIGS. 9 to 11, the turbojet engine 5 is hidden by the inner structure 110 of the nacelle in the working position.

The inner structure 110 is formed of a fixed fairing part 114 extending longitudinally at the top, and of a mobile shell 113, of substantially cylindrical shape, surrounding the turbojet engine 5. The shell 113 has a slot 134 running longitudinally along the top and of a shape that complements that of the fixed fairing part 114.

The fixed fairing part 114 is fixed upstream (with reference to the direction in which the gases flow) to a frame 115 secured to the turbojet engine 5 and is attached, downstream, to the turbojet engine 5, via supporting link rods 117 and, via link rods 118 supports a suspension strut 116 the purpose of which is for attaching the nacelle under a wing of the airplane (the wing is not depicted).

The frame 115 has a perforated structure of annular shape concentrically surrounding the turbojet engine 5 attached continuously thereto at an internal V-slot of the turbojet engine 5 structure.

Quite clearly, the perforated structure of the frame 115 is dependent on the configuration of the turbojet engine and is not compulsory.

As an alternative, it may be noted that it is possible to provide a number of fixed fairing parts 114 and a number of moving parts 113. In particular, it is possible to provide a fixed fairing part 114 situated as described at the 12 o'clock position and a second fixed fairing part situated in the same way at the 6 o'clock position.

The annular structure of the frame 115 is protected from the heat released by the turbojet engine 5 by protective means (not depicted) known per se and has a certain axial depth in order to reduce the length of the upstream structure of the internal fixed structure IFS so as to provide best access to those parts of the turbojet engine that need to be accessed once the IFS has been pulled back.

The shell 113 of the inner structure 110 of the nacelle is slidably mounted on each side of the fixed fairing part 114, by sliding of the side walls of the longitudinal slot 134 of the shell 113 against the side walls of the fixed fairing part 114 between an upstream working position and a downstream maintenance position.

The side walls of the fixed fairing part 114 for this purpose have rails 140 (visible in FIG. 15) for guiding the axial (longitudinal) translational movement of the shell 113, which has corresponding slides 141. The reverse arrangement (rail on the shell 113 and slide on the fixed fairing part) is quite obviously possible.

Figure 15:
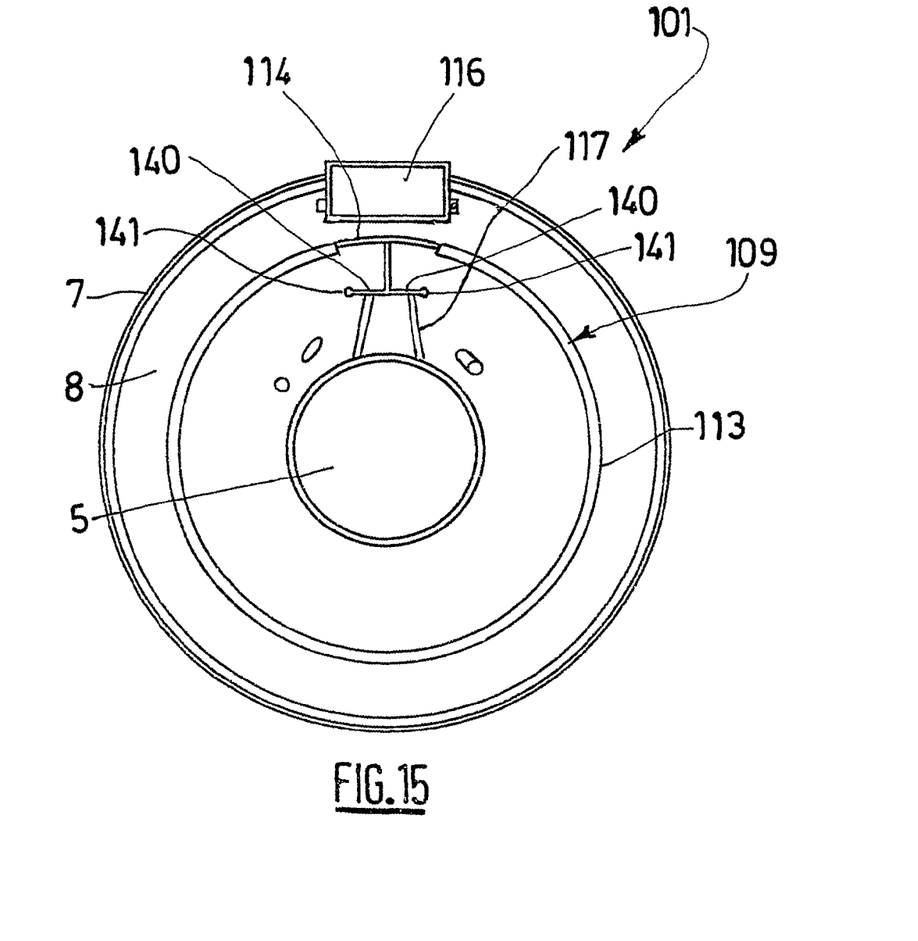
FIG. 15 is a face-on schematic sectional view of a downstream part of a nacelle according to FIGS. 9 to 14.

As an alternative, and as depicted in FIG. 15, the rails 140 or slides 141 may be arranged not along the side walls but in other configurations. The essential feature is for the fixed fairing part 114 to support guide means able to collaborate with complementary guide means of the shell 113 so as to allow said shell 113 a longitudinal movement along the fixed fairing part 114.

The shape of the fixed fairing part 114 is curved so that, in the working position (see FIGS. 9 to 11) it more or less falls inside the exterior contour of the shell 113, closing off the longitudinal slot 134 therein. Indeed it is important to ensure aerodynamic continuity within the annular duct 8.

Figure 12:
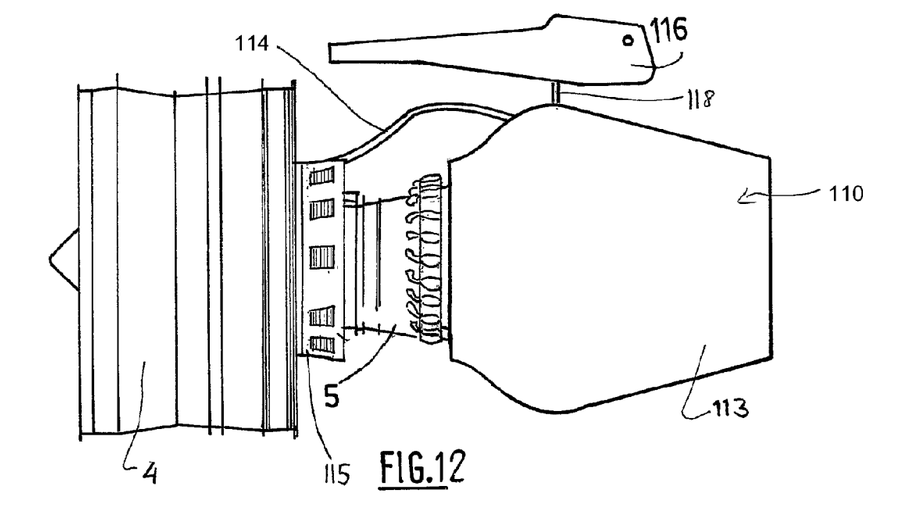
FIG. 12 is a view similar to FIG. 9 of the nacelle in the maintenance position.
Figure 13:
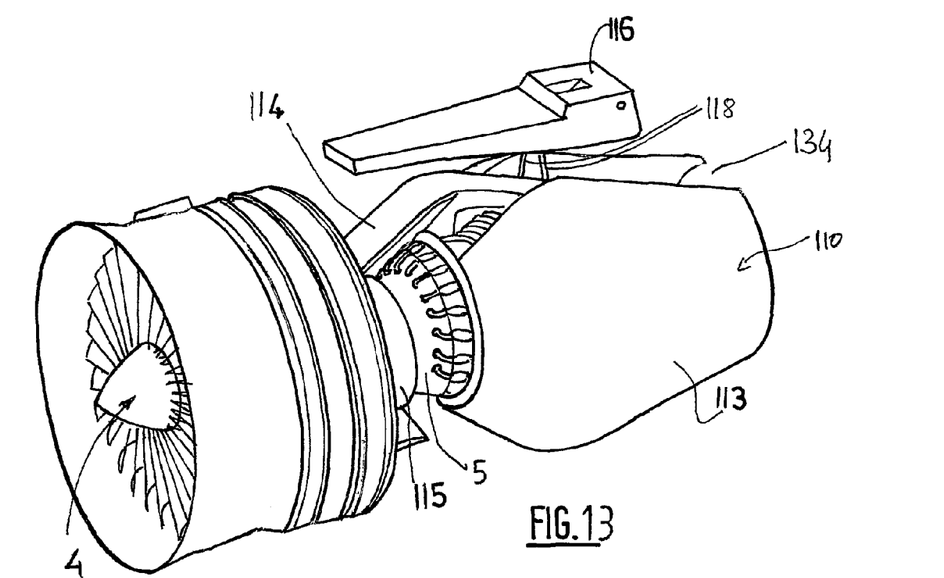
FIG. 13 is a view similar to FIG. 10 in the maintenance position.
Figure 14:
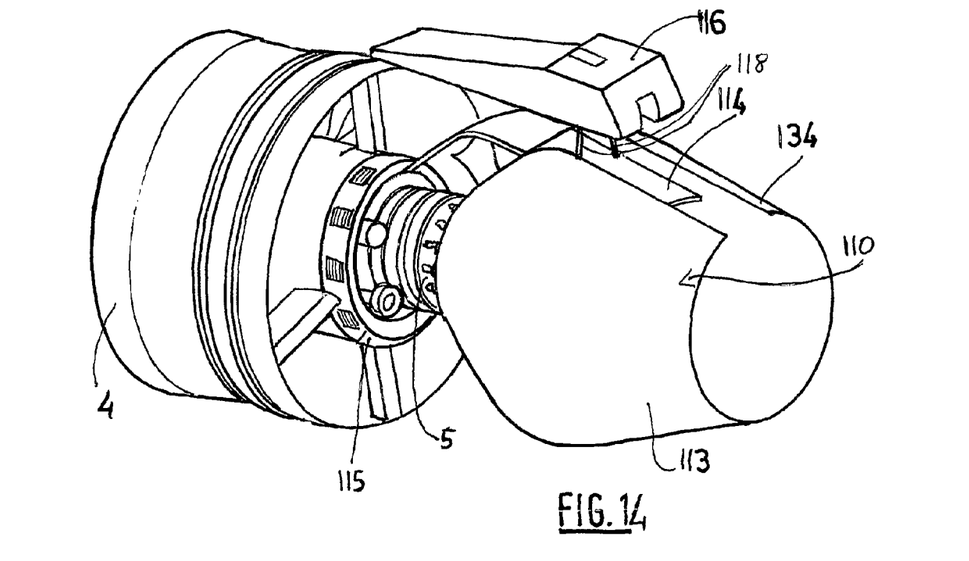
FIG. 14 is a view similar to FIG. 11 in the maintenance position.

In the maintenance position illustrated in FIGS. 12 to 14, the shell 113 has been moved in the downstream direction so as to uncover that part of the turbojet engine that is to be inspected.

The shell 113 may also be attached to the outer fixed structure OFS (not visible) via two driving link rods (not depicted) which are profiled if this outer structure can also be opened in a translational movement. As it moves, the outer structure 106 of the nacelle thus pulls on the shell 113 of the inner structure 110 through the interposition of driving link rods.

In its maintenance position or in order to remove the IFS, depending on whether or not the structure of the IFS can be slid out fully as it is through the downstream end of the turbojet engine 5 without encountering any obstacle, the inner structure 110 may have a complete or discrete link along the lower structure so that each half-part can be detached and removed independently of the other unimpeded by turbojet engine parts.

More specifically, for maintenance, in the retracted position, hatches made in the structure of the IFS provide access to certain turbojet engine parts.

Although the invention has been described in conjunction with a particular embodiment, it is quite obvious that it is not in any way restricted thereto and that it comprises all technical equivalents of the means described and combinations thereof where these fall within the scope of the invention.

The invention claimed is:

1. A nacelle for a turbojet engine, of the type comprising a downstream structure comprising:
   an outer structure which defines, with a concentric inner structure surrounding a downstream part of the turbojet engine, an annular flow duct, wherein at least part of said inner structure is slidably mounted such that the inner structure moves translationally along a longitudinal axis of the nacelle, without pivoting, so that the inner structure can be moved between a working position in which the inner structure acts as a case for the downstream part of the turbojet engine and a maintenance position in which the inner structure uncovers said downstream part of the turbojet engine, wherein the inner structure moves translationally with respect to the nacelle by means of at least one pair of rails and slides, each rail cooperating with one slide having a curved portion.

2. The nacelle as claimed in claim 1, wherein the inner structure is produced in the form of at least two half-parts.

3. The nacelle as claimed in claim 2, wherein the half-parts are situated on each side of a longitudinal plane of symmetry of the nacelle.

4. The nacelle as claimed in claim 1, wherein the slide is intended to be fixed to the downstream part of the turbojet engine while the corresponding rail is secured to the inner structure, or vice versa.

5. A bypass turbojet engine intended to be inserted in a nacelle as claimed in claim 4, comprising a downstream part having at least one slide or one rail able to collaborate with a rail or a slide secured to an inner structure of the nacelle.

6. The turbojet engine as claimed in claim 5, wherein the slide or the rail that is intended to be fixed to the downstream part of the turbojet engine has at least one curved upstream portion capable of allowing radial divergence or convergence with respect to the inner structure during movement along the downstream part of the turbojet engine, and a substantially straight downstream portion that is preferably substantially parallel to a plane of symmetry of the nacelle.

7. The turbojet engine as claimed in claim 6, wherein the upstream portion for radial divergence or convergence is of parabolic shape.

8. A nacelle for a turbojet engine, of the type comprising a downstream structure comprising:

an outer structure which defines, with a concentric inner structure intended to surround a downstream part of the turbojet engine, an annular flow duct, wherein at least part of said inner structure is slidably mounted such that the inner structure moves translationally along a longitudinal axis of the nacelle, without pivoting, so that the inner structure moves between a working position in which the inner structure acts as a case for the downstream part of the turbojet engine and a maintenance position in which the inner structure uncovers said downstream part of the turbojet engine, wherein the inner structure has at least one fixed fairing part which is fixed upstream to the turbojet engine and closing off a longitudinal slot on a periphery of the inner structure in the working position.

9. The nacelle as claimed in claim 8, wherein the fixed fairing part is fixed downstream to means of suspending the turbojet engine from a strut.

10. The nacelle as claimed in claim 8, wherein the fixed fairing part has, downstream, means of suspension from the turbojet engine.

11. The nacelle as claimed in claim 8, wherein said fixed fairing part has a shape such that in the working position, it falls more or less inside the exterior contour of the inner structure.

12. The nacelle as claimed in claim 8, wherein the fixed fairing part has at least one lateral rail, or a slide, able to collaborate with a complementary slide, or a rail, of the inner structure.

* * * * *